United States Patent [19]

Schaefer

[11] Patent Number: 4,497,688

[45] Date of Patent: Feb. 5, 1985

[54] OIL SCAVENGING MATERIAL

[76] Inventor: Ernest R. Schaefer, 40 Country Corners Rd., Wayland, Mass. 01778

[21] Appl. No.: 477,155

[22] Filed: Mar. 21, 1983

Related U.S. Application Data

[63] Continuation of Ser. No. 265,385, May 20, 1981, abandoned.

[51] Int. Cl.³ ............................................. D21H 3/66
[52] U.S. Cl. .................................. 162/181.1; 106/89; 106/97; 106/98; 106/99; 162/189; 162/DIG. 9; 210/691; 210/924; 210/928
[58] Field of Search ............... 162/189, 190, DIG. 9, 162/181.1; 106/89, 97–99; 210/924, 691, 665, 667, 928

[56] References Cited

U.S. PATENT DOCUMENTS

| | | | |
|---|---|---|---|
| 2,703,289 | 3/1955 | Willson | 106/97 |
| 3,188,751 | 6/1965 | Sutton | 162/DIG. 9 |
| 3,320,076 | 5/1967 | Sutton | 162/DIG. 9 |
| 3,860,433 | 1/1975 | Ost et al. | 106/89 |

FOREIGN PATENT DOCUMENTS

| | | | |
|---|---|---|---|
| 1804419 | 5/1970 | Fed. Rep. of Germany | 210/924 |
| 48-35354 | 10/1973 | Japan | 162/DIG. 9 |
| 7514396 | 6/1977 | Netherlands | 162/DIG. 9 |
| 1275042 | 5/1972 | United Kingdom | 162/DIG. 9 |
| 1441234 | 6/1976 | United Kingdom | 162/DIG. 9 |

*Primary Examiner*—Peter Chin
*Attorney, Agent, or Firm*—Robert E. Meyer

[57] ABSTRACT

A material for scavenging oil slick and/or oleaginous fluids comprising paper-machine sludge combined in the presence of water with a hydraulic cement and dried.

3 Claims, No Drawings

4,497,688

OIL SCAVENGING MATERIAL

This is a continuation of application Ser. No. 265,385 filed May 20, 1981, now abandoned.

BACKGROUND OF INVENTION

Organic fibers have been used heretofore for absorbing or adsorbing oil; however, they also tend to absorb water and, hence, their capacity for sorbing oil is limited. Nevertheless, the availability of paper machine sludge derived from the white water of effluent from the paper making machines in the paper making industry as a source of fibers at low cost and in large volume is attractive. Accordingly, it is an object of the present invention to take advantage of this availability and low cost of paper machine sludge by converting it to a material capable of sorbing oil substantially to the exclusion of water. Further objects are to convert the sludge of a material which will float on the surface of fresh or salt water indefinitely substantially without sorbing water; which will continue to float after it becomes impregnated with the oil; which can be skimmed off the surface and the oil recovered therefrom by draining or mechanical squeezing; which can be produced in the form of cakes, pellets or powder for deposit on the surface of the water; which is non-toxic; which is environmentally acceptable; and which can be produced at a low cost with a minimum amount of equipment.

SUMMARY OF INVENTION

As herein described, the oil scavenging material of this invention may be particulate or in cake form; will float indefinitely on the surface of fresh or salt water, whether smooth or agitated; will absorb or adsorb (hereinafter sorb) oil exclusively from the surface of the water on which it floats in an amount of about fives times its volume, will remain floating though saturated, thus enabling skimming from the surface, and will release the sorbed oil after it has been skimmed from the surface, for example, by pressing, so that it can be recovered.

The oil scavenging material is compounded of paper machine sludge of Portland cement combined in the presence of water and then dried. The paper machine sludge preferred for use comprises approximately 80 percent very short length wood fibers with some short length cotton fibers and 20 percent other solids. The wood and cotton fibers are present in the form of substantially pure cellulose, free of any substantial amount of resin and/or resinous materials. The other solids comprise titanium oxide, precipitated silica and papermaker's clay and exist in proportions of approximately ⅓ titanium oxide, ⅓ silica and ⅓ paper maker's clay. The Portland cement used is a very high early strength, extremely fast-setting hydraulic cement of the kind described in Ost et al U.S. Pat. No. 3,860,433. This is available from U.S. Gypsum Co. under the trademark VHE cement and is described in said patent as being a fast setting hydraulic cement having very high compressive strengths within a few hours of mixing with water, and generally from about 2,900 to over 5,000 p.s.i. within 24 hours, containing beta $2CaO.SiO_2$, $3CaO.CaSO_4$ and chemically unbound $CaSO_4$ obtained by firing at a temperature between about 1,200 and 1,600° C. for about 1 to 5 hours a mixture of a source respectively of $CaO$, $SiO_2$, $Al_2O_3$ and $SO_3$ in proportions of about 1 to 3 moles of $CaSO_4$ to about $(0.5$ to $2)+2n$ moles of $CaCO_3$ per mole of $Al_2O_3.nSiO_2$ and grinding the resultant clinker where n is about 1.5 to about 2.5. The raw sludge which has a consistency similar to papier-mache, and the cement are combined in the proportion of 1 pound of raw sludge to ¼ to 3 ounces of cement. One pound of the raw sludge comprises substantially 3 ounces of solids comprising the fibers and other solids and the remainder water. The preferred sludge is obtained from the Strathmore Paper Company, Westfield, Mass., as a by-product of its daily manufacture of high quality paper including cotton content Bond paper, artists' paper and Bristol board. The mixture of sludge and cement when dried and formed into cakes, pellets or powder, is capable of sorbing up to five times its weight of oil and, when placed on an oil slick, whether in the presence of water or not, is capable of sorbing the oil to the exclusion of water. The material will release the sorbed oil after it has been skimmed from the surface of the water by mechanical working, for example, squeezing, so that it may be used over again.

According to the method of making the product, paper machine sludge, a by-product resulting from the process of making paper, is used of the ingredients and hydraulic cement of the kind disclosed in U.S. Pat. No. 3,860,433 as the other ingredient. The paper machine sludge used is recovered from the white water of effluent of the paper making machine and consists of fine paper-making fibers and other solids which pass through the screen of the paper-making machine dispersed in large quantities of water. The solids in the white water are separated from the water in large settling tanks with the aid of organic flocculants such as Polyisle A-150 supplied by Carlisle Chemical Corp. of Merrimack, N.H. When filtered from the water the sludge has a consistency not unlike papier-mache. A typical batch of raw sludge contains about 20 percent total solids. The solids are found by analysis to be approximately 80 percent wood and cotton fibers and approximately 20 percent other solids. The fibers are high quality paper-making fibers although extremely short in length of substantially pure cellulose, substantially free of resin or resinous material. The solids comprise approximately one-third titanium pigment, one-third silica and one-third paper-maker's clay.

The material is prepared by mixing 1 oz. of cement into 1 pound of raw sludge wherein the 1 pound of sludge comprises 3 oz. of total solids and the remainder water, spreading the mixture out on sheets and drying the same, preferably at low temperature. When using the preferred cement, the material dries or sets in a very short time, usually less than an hour when spread out on sheets and exposed to relatively low temperature drying conditions such as sunlight or being placed on the top of a furnace. Upon drying or setting, the material turns into a light gray friable mass which can readily be broken into pieces or ground into a powder as desired. In the commercial production it is contemplated that the mix will be formed into pellets and dried at relatively low temperatures in an oven.

It was found to be essential to the invention to use a high quality paper-machine sludge such as described above to obtain an end product which would sorb oil on the surface without sinking to the bottom and without relinquishing the sorbed oil. Paper-machine sludges were obtained from a number of sources other than the Strathmore Paper Company. These included sludges from newsprint mills, Kraft mills and tissue mills. In each case even when mixed with the preferred Portland cement in the presence of water the resulting product when added to oil floating on water immediately sank to the bottom.

It is believed the success achieved by using the sludge obtained from the Strathmore Paper Company derives from the fact that the cotton and wood fibers used by Strathmore Paper Company for making paper were of extremely high quality and, to a substantial degree, free of resin and resinous material such as the natural resins such as the lignins present, for example, in ground wood pulp or the wet strength resins found in Kraft and tissue pulps.

Also contributing to the success of the product is the use of the hydraulic cement described in the aforesaid U.S. Pat. No. 3,860,433 which is a very high early strength, rapidly-setting cement. In fact, it was found that, except for the use of the cement disclosed in the aforesaid patent, mixtures of other cements with the sludge resulted in a product which absorbed water and sank to the bottom.

The preferred cement is distinguished from conventional Portland cements including even the normal high early strength or Type III cements by the fact that it develops a very high compressive strength in a very few hours. This characteristic is discussed in some detail in the referred to Ost et al U.S. Pat. No. 3,860,433. As a matter of example comparative runs were made using typical Type I, Type I-A and Type III cements in identical proportions using identical samples of raw sludge to the preferred VHE cement. Each of the Type I, Type I-A and Type III mixtures with the sludge required 12 to 24 hours to set up compared to the 45 minutes required for the mixture with the VHE cement. When added to a glass containing 1 oz. of No. 6 oil floating on top of water both the Type I and Type I-A compounds sorbed the oil and sank immediately to the bottom of the glass. After about 5 minutes the oil started to be released and to refloat to the surface, the compound remaining on the bottom. With the Type III cement the compound sank immediately to the bottom without apparently sorbing any appreciable amount of the oil. With the compound made of the VHE cement, 0.063 oz. of compound sorbed 1 oz. of No. 6 oil and the resulting mass remained floating on the surface of the water with the oil retained within the floating fibrous mass.

Numerous experiments were conducted to determine the capability of the material for absorbing various kinds of oils and it was found capable of sorbing crude oil, crankcase oil, olive oil and salad oil.

The scavenging material as thus described can be spread loose or packed in nets or booms to sorb or contain oil spills and, as related above, it soaks up about five times or more of its own weight in oil and its sorption rate is much higher than any of the products now used for cleaning up oil spills. After the oil has been sorbed by the material, the latter can be gathered in place in holding tanks. As long as the material remains on the surface of the water, it will continue to hold the oil, but about 30 minutes after it has been removed or skimmed from the water, it starts releasing the sorbed oil while continuing to hold the dirt or foreign matter that may have contaminated the spill, thus enabling recovery of the oil.

The material is not harmful to marine life, is capable of being dispensed in spill areas by either ship or aircraft and is not affected by water temperature of rough seas. Neither the sludge nor the cement used is a pollutant nor in any way toxic and so is environmentally unobjectionable.

Since the major component of the compound is the sludge which is a by-product of a paper-making operation and, hence, can be obtained at a very low cost and the method of compounding it with the cement to obtain the desired end product involves the use of very inexpensive equipment, the resulting product has a tremendous advantage over any of the known and commercially-available oil scavenging materials heretofore manufactured.

It should be understood that the present disclosure is for the purpose of illustration only and includes all modifications or improvements which fall within the scope of the appended claims.

What is claimed is:

1. Method of scavenging an oil slick which comprises contacting that oil slick with a quantity of particles derived from a friable material formed from paper machine sludge combined in the presence of water with a very high early strength, fast-setting portland cement and dried in the absence of substantial pressure at a moderate temperature, said sludge comprising the sludge formed from the paper-making machine fluid discharge in the daily manufacture of high quality bond and artistic paper and having a consistency similar to papier mache with a ratio of water to solids in said sludge such that about one pound total sludge contains about three ounces of paper machine sludge solids, said sludge solids containing approximately 80 percent substantially pure cellulose fibers derived from wood and cotton fibers and approximately 20 percent other solids comprising titanium pigment, silica pigment and papermaker's clay in substantial equal quantities, said sludge being substantially free of resinous materials, said very high early strength, fast-setting portland cement being a fast-setting hydraulic cement having very high compressive strengths within a few hours of mixing with water, and generally from about 2,900 to over 5,000 p.s.i. within 24 hours, containing beta $2CaO.SiO_2$, $3CaO.CaSO_4$ and chemically unbound $CaSO_4$ obtained by firing at a temperature between about 1,200° and 1,600° C. for about 1 to 5 hours a mixture of a source respectively of $CaO$, $SiO_2$, $Al_2O_3$ and $SO_3$ in proportions of about 1 to 3 moles of $CaSO_4$ to about (0.5 to 2)+2n moles of $CaCO_3$ per mole of $Al_2O_3.nSiO_2$ and grinding the resultant clinker where n is about 1.5 to about 2.5, wherein the ratio of paper machine sludge solids to portland cement solids is about three parts by weight of sludge solids to between about one-half part and about three parts by weight of cement solids, said friable material characterized in that when placed on an oil slick it will sorb up to five times its weight of oil substantially to the exclusion of any water that may be present in the vicinity of the oil and will continue to float on such water even when saturated with oil, and removing the oil-containing particles together with the oil contained therewith from the area of the oil slick.

2. Method according to claim 1 wherein the oil-containing material releases the contained oil after it is removed from the surface of any water on which the oil slick may have been floating, said method characterized by collecting the oil so removed and released.

3. A material for use in practicing the method according to claim 1, said material formed from paper machine sludge combined in the presence of water with a very high early strength, fast-setting portland cement and dried in the absence of substantial pressure at a moderate temperature, said sludge comprising the sludge formed from the paper-making machine fluid discharge in the daily manufacture of high quality bond and artistic paper, and having a consistency similar to papier mache with a ratio of water to solids in said sludge such that about one pound total sludge contains about three ounces of paper machine sludge solids, said sludge solids containing approximately 80 percent substantially pure cellulose fibers derived from wood and cotton fibers and approximately 20 percent other solids comprising titanium pigment, silica pigment and papermaker's clay in substantially equal quantities, said sludge being substantially free of resinous materials, said very high early strength, fast-setting portland cement being a fast-setting hydraulic cement having very high compressive strengths within a few hours of mixing with water, and generally from about 2,900 to over 5,000 p.s.i. within 24 hours, containing beta $2CaO.SiO_2$, $3CaO.CaSO_4$ and chemically unbound $CaSO_4$ obtained by firing at a temperature between about 1,200° and 1,600° C. for about 1 to 5 hours a mixture of a source respectively of CaO, $SiO_2$, $Al_2O_3$ and $SO_3$ in proportions of about 1 to 3 moles of $CaSO_4$ to about (0.5 to 2)+2n moles of $CaCO_3$ per mole of $Al_2O_3.nSiO_2$ and grinding the resultant clinker where n is about 1.5 to about 2.5, wherein the ratio of paper machine sludge solids to portland cement solids is about three parts by weight of sludge solids to between about one-half part and about three parts by weight of cement solids.

* * * * *